United States Patent
Dong et al.

(10) Patent No.: US 12,467,131 B2
(45) Date of Patent: Nov. 11, 2025

(54) FABRICATION METHODS FOR 3D STRUCTURES BASED ON ROLLING-UP KIRIGAMI TECHNIQUES

(71) Applicant: City University of Hong Kong, Kowloon (HK)

(72) Inventors: Lixin Dong, Kowloon (HK); Kun Wang, Kowloon (HK); Chaojian Hou, Kowloon (HK); Zhang Wenqi, Kowloon (HK)

(73) Assignee: City University of Hong Kong, Kowloon (HK)

( * ) Notice: Subject to any disclaimer, the term of this patent is extended or adjusted under 35 U.S.C. 154(b) by 105 days.

(21) Appl. No.: 18/480,224

(22) Filed: Oct. 3, 2023

(65) Prior Publication Data
US 2025/0109487 A1   Apr. 3, 2025

(51) Int. Cl.
| | | |
|---|---|---|
| *C23C 14/58* | (2006.01) | |
| *C23C 14/02* | (2006.01) | |
| *C23C 14/14* | (2006.01) | |
| *C23C 14/30* | (2006.01) | |
| *C23C 16/34* | (2006.01) | |
| *C23C 16/513* | (2006.01) | |
| *C23C 16/56* | (2006.01) | |
| *C23C 28/00* | (2006.01) | |

(52) U.S. Cl.
CPC ........ *C23C 14/5873* (2013.01); *C23C 14/028* (2013.01); *C23C 14/14* (2013.01); *C23C 14/30* (2013.01); *C23C 16/345* (2013.01); *C23C 16/513* (2013.01); *C23C 16/56* (2013.01); *C23C 28/32* (2013.01); *C23C 28/34* (2013.01)

(58) Field of Classification Search
None
See application file for complete search history.

(56) References Cited

U.S. PATENT DOCUMENTS

| | | | | |
|---|---|---|---|---|
| 2010/0290101 A1* | 11/2010 | Kim | ................... | G02B 5/005 |
| | | | | 430/319 |
| 2014/0104030 A1* | 4/2014 | Li | ................... | H01F 27/2847 |
| | | | | 29/605 |
| 2018/0323055 A1* | 11/2018 | Woodruff | .......... | C23C 16/45553 |

OTHER PUBLICATIONS

M.L. Chen et al., A FinFET with one atomic layer channel, Nat. Commun. 2020, 11, 1205, https://doi.org/10.1038/s41467-020-15096-0.

(Continued)

*Primary Examiner* — Joshua L Allen
*Assistant Examiner* — Bradford M Gates
(74) *Attorney, Agent, or Firm* — Norton Rose Fulbright US LLP

(57) ABSTRACT

Fabrication methods are provided for transforming two-dimensional films into three-dimensional structures based on rolling-up kirigami techniques. In an example, a method includes forming a first layer of a first material on a portion of a substrate, forming a second layer of a second material on the first layer and a second portion of the substrate, and forming a third layer of a third material on a first portion of the second layer. A pattern is formed into the third layer when forming the third layer. The example method further includes transforming at least a portion of the third layer into a three-dimensional structure based in part on removing a second portion of the second layer and at least a portion of the first layer.

20 Claims, 15 Drawing Sheets

(56) References Cited

OTHER PUBLICATIONS

C. C. Liu et al., Directed self-assembly of block copolymers for 7 nanometre FinFET technology and beyond, Nat. Electron. 2018, 1, 562-569, https://doi.org/10.1038/s41928-018-0147-4.

P. Lin et al., Three-dimensional memristor circuits as complex neural networks, Nat. Electron. 2020, 3, 225, https://doi.org/10.1038/s41928-020-0397-9.

T. Y. Wang et al., Three-Dimensional Nanoscale Flexible Memristor Networks with Ultralow Power for Information Transmission and Processing Application, Nano Lett. 2020, 20, 4111.

L. Zhang et al., Artificial bacterial flagella: Fabrication and magnetic control, Appl. Phys. Lett. 2009, 94, 064107.

C. Cho et al., Highly Strain-Tunable Interlayer Excitons in $MoS_2$/$WSe_2$ Heterobilayers, Nano Lett. 2021, 21, 3956.

C. Hou et al., Multilayer Black Phosphorus Near-Infrared Photodetectors, Sensors 2018, 18, 1668.

L. Chen et al., Characterization of Carbon Nanotube Based Infrared Photodetector Using Digital Microscopy, Nanosci. Nanotechnol. 2017, 17, 482.

L. Jin et al., Kirigami-Inspired Inflatables with Programmable Shapes, Adv. Mater. 2020, 32, 2001863.

Y. Yang et al., Grasping with kirigami shells, Sci. Robot. 2021, 6, eabd6426.

N. An et al., Programmable Hierarchical Kirigami, Adv. Funct. Mater. 2020, 30, 1906711.

Y. C. Cheng et al., , A. Priimagi, Kirigami-Based Light-Induced Shape-Morphing and Locomotion Adv. Mater. 2020, 32, 1906233.

A. Rafsanjani et al., Kirigami skins make a simple soft actuator crawl, Sci. Robot. 2018, 3, eaar7555.

V. Y. Prinz et al., Free-standing and overgrown InGaAs=GaAs nanotubes, nanohelices and their arrays Physica E: Low-dimensional Systems and Nanostructures 2000, 6, 828.

H. Wang et al., Self-rolling and light-trapping in flexible quantum well-embedded nanomembranes for wide-angle infrared photodetectors, Sci. Adv. 2016, 2, e1600027.

Y. Lee et al., Nano-biosupercapacitors enable autarkic sensor operation in blood, Nat. Commun. 2021, 12, 4967.

W. Huang et al., Three-dimensional radio-frequency transformers based on a self-rolled-up membrane platform Nat. Electron. 2018, 1, 305.

D. D. Karnaushenko et al., Rolled-Up Self-Assembly of Compact Magnetic Inductors, Transformers, and Resonators Adv. Electron. Mater. 2018, 4, 1800298.

J. Li et al., Diatomite-Templated Synthesis of Freestanding 3D Graphdiyne for Energy Storage and Catalysis Application Adv. Mater. 2018, 30, 1800548.

F. Zhang et al., Rapidly deployable and morphable 3D mesostructures with applications in multimodal biomedical devices, Proceedings of the National Academy of Sciences 2021, 118, e2026414118.

R.K. Jayne et al., Dynamic Actuation of Soft 3D Micromechanical Structures Using Micro-Electronmechanical Systems (MEMS), Adv. Mater. Technol. 2018, 3, 1700293, DOI: 10.1002/ADMT.201700293.

Xiaoyu Zheng et al. ,Ultralight, ultrastiff mechanical metamaterials, Science344,1373-1377(2014).DOI:10.1126/science.1252291.

Bertoldi, K. et al. Flexible mechanical metamaterials. Nat. Rev. Mater. 2, 17066(2017).

I. Fernandez et al., New Twists of 3D Chiral Metamaterials, *Adv. Mater.* 2019, 31, 1807742. https://doi.org/10.1002/adma.201807742.

T. Tancogne-Dejean et al., 3D Plate-Lattices: An Emerging Class of Low-Density Metamaterial Exhibiting Optimal Isotropic Stiffness, Adv. Mater. 2018, 30, 1803334, https://doi.org/10.1002/adma.201803334.

J. K. Chang et al., Biodegradable Electronic Systems in 3D, Heterogeneously Integrated Formats, Adv. Mater. 2018, 30, 1704955, https://doi.org/10.1002/adma.201704955.

C. Hou et al., Position Sensitivity of optical nano-antenna arrays on optoelectronic devices, Nano Energy 2018, 53, 734, https://doi.org/10.1016/j.nanoen.2018.09.047.

Z. Tian et al., Deterministic Self-Rolling of Ultrathin Nanocrystalline Diamond Nanomembranes for 3D Tubular/Helical Architecture, Adv. Mater. 2017, 29, 1604572, DOI:10.1002/adma.201604572.

C. C. Bof Bufon et al., Self-Assembled Ultra-Compact Energy Storage Elements Based on Hybrid Nanomembranes, Nano Lett. 2010, 10, 2506, DOI: 10.1021/nl1010367.

C. Chen et al., Predictive Modeling of Misfit Dislocation Induced Strain Relaxation Effect on Self-Rolling of Strain-Engineered Nanomembranes, Appl. Phys. Lett. 2018, 113, 112104, https://doi.org/10.1063/1.5046314.

C. Chen et al, Quantitative analysis and predictive engineering of self-rolling of nanomembranes under anisotropic mismatch strain, Nanotechnology, 28, 485302, DOI 10.1088/1361-6528/aa94aa.

L. Dai et al., Strain-driven self-rolling mechanism for anomalous coiling of multilayer nanohelices, J. Appl. Phys. 2009, 106, 114314, https://doi.org/10.1063/1.3267866.

Q. Ze et al., Soft robotic origami crawler, Sci. Adv. 8, eabm7834(2022), DOI:10.1126/sciadv.abm7834.

Z. Liu et al., Nano-kirigami with giant optical chirality, Sci. Adv.4, eaat4436 (2018).DOI:10.1126/sciadv.aat4436.

T. Wang et al., Etching-Free Ultrafast Fabrication of Self-Rolled Metallic Nanosheets with Controllable Twisting, Nano Lett. 2021, 21, 7159, DOI: 10.1021/acs.nanolett.1c01789.

C. Chen et al., Effect of topological patterning on selfrolling of nanomembranes, Nanotechnology 2018, 29, 345301, DOI 10.1088/1361-6528/aac8fe.

P. Zhu et al., Direct Writing of Flexible Barium Titanate/Polydimethylsiloxane 3D Photonic Crystals with Mechanically Tunable Terahertz Properties Adv. Opt. Mater. 2017, 5, 1600977, DOI: 10.1002/adom.201600977.

P. Aseev et al., Selectivity Map for Molecular Beam Epitaxy of Advanced III-V Quantum Nanowire Networks, Nano Lett. 2018, 19, 218, DOI: 10.1021/acs.nanolett.8b03733.

T. Chen et al., Stabilizing lithium metal anode by molecular beam epitaxy grown uniform and ultrathin bismuth film, Nano Energy 2020, 76, 105068, doi.org/10.1016/j.nanoen.2020.105068.

Y. Zhang et al., Recent Progress in CVD Growth of 2D Transition Metal Dichalcogenides and Related Heterostructures, Adv. Mater. 2019, 31, 1901694, DOI: 10.1002/adma.201901694.

C. Yang et al., Characteristic Study of Silicon Nitride Films Deposited by LPCVD and PECVD, Silicon 2018, 10, 2561, https://doi.org/10.1007/s12633-018-9791-6.

G. Wang et al., Tunable Electronic Properties of Few-Layer Tellurene under In-Plane and Out-of-Plane Uniaxial Strain, Nanomaterials 2022, 12, 875, https://doi.org/10.3390/nano12050875.

Y.C. Tsui et al., An analytical model for predicting residual stresses in progressively deposited coatings Part 1: Planar geometry, Thin Solid Films 1997, 306, 23.

I. S. Chun et al., Geometry Effect on the Strain-Induced Self-Rolling of Semiconductor Membranes Nano Lett. 2010, 10, 3927, DOI: 10.1021/nl101669u.

N. Hu et al., Edge effect of strained bilayer nanofilms for tunable multistability and actuation, Nanoscale 2017, 9, 2958, DOI: 10.1039/c6nr08770a.

Z. Tian et al., Anisotropic Rolling and Controlled Chirality of Nanocrystalline Diamond Nanomembranes toward Biomimetic Helical Frameworks, Nano Lett. 2018, 18, 3688, DOI: 10.1021/acs.nanolett.8b00828.

S. Alben et al., Edge Effects Determine the Direction of Bilayer Bending, Nano Lett. 2011, 11, 2280-2285, dx.doi.org/10.1021/nl200473p.

S. Timoshenko, Analysis of Bi-Metal Thermostats, Josa 1925, 11, 233.

K. Sun et al., $VO_2$ Thermochromic Metamaterial-Based Smart Optical Solar Reflector, ACS Photonics 2018, 5, 2280, DOI: 10.1021/acsphotonics.8b00119.

U. Brand et al., Comparing AFM cantilever stiffness measured using the thermal vibration and the improved thermal vibration methods

(56) References Cited

OTHER PUBLICATIONS with that of an SI traceable method based on MEMS, Meas. Sci. Technol. 2017, 28, 034010, doi:10.1088/1361-6501/28/3/034010.
S. Park et al., Dielectric constant measurements of thin films and liquids using terahertz metamaterials, RSC Adv. 2016, 6, 69381, DOI: 10.1039/c6ra11777e.
L. Qi et al., A broad dual-band switchable graphene-based terahertz metamaterial absorber, Carbon 2019, 153, 179, https://doi.org/10.1016/j.carbon.2019.07.011.
H. Liu et al. Vanadium dioxide-assisted broadband tunable terahertz metamaterial absorber, Sci Rep 9, 5751 (2019), https://doi.org/10.1038/s41598-019-42293-9.
K. Yang et al., THz Spectroscopy for a Rapid and Label-Free Cell Viability Assay in a Microfluidic Chip Based on an Optical Clearing Agent, Analytical Chemistry 2019, 91 (1), 785-791, DOI: 10.1021/acs.analchem.8b03665.

\* cited by examiner

|  | Z displacement (μm) | | | θ (rad) |
| --- | --- | --- | --- | --- |
|  | Point at (0,0,0) | Point at (10,0,0) | Difference |  |
| Micro-pinwheel 1(4) | -3.01 | -3.18 | 0.17 | 0.019 |
| Micro-pinwheel 1(6) | -2.93 | -2.39 | -0.54 | 0 |
| Micro-pinwheel 1(8) | 0.88 | 1.04 | -0.16 | 0.003 |
| Micro-pinwheel 1(10) | -1.78 | -1.76 | -0.02 | 0.01 |
| Micro-pinwheel 3(4) | -3.91 | -3.30 | -0.61 | 0.094 |
| Micro-pinwheel 3(6) | -4.63 | -4.43 | -0.20 | 0.019 |
| Micro-pinwheel 3(8) | -0.82 | -0.70 | -0.12 | 0.008 |
| Micro-pinwheel 3(10) | 3.82 | 4.20 | -0.38 | 0.074 |

FIG. 5

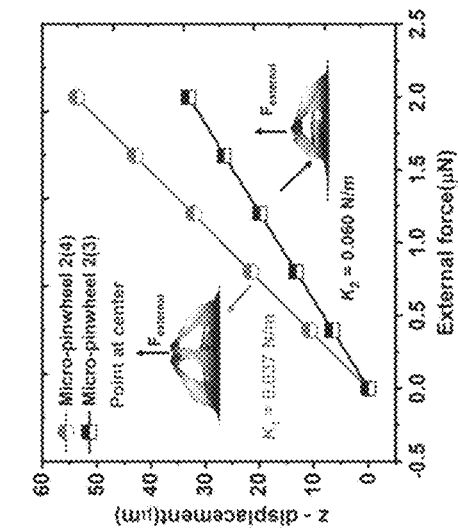
FIG. 9A
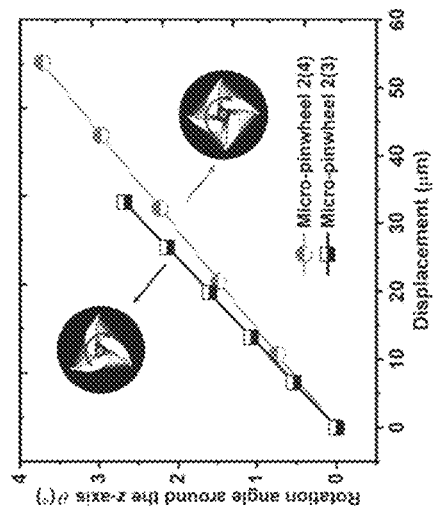
FIG. 9B
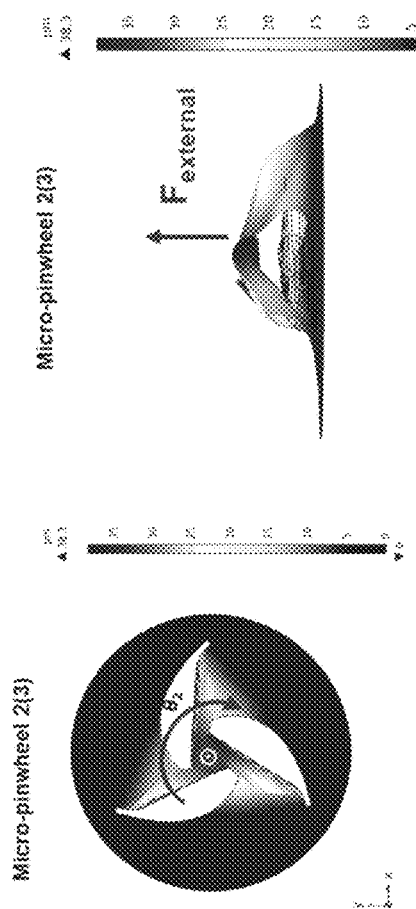
FIG. 9C
FIG. 9E
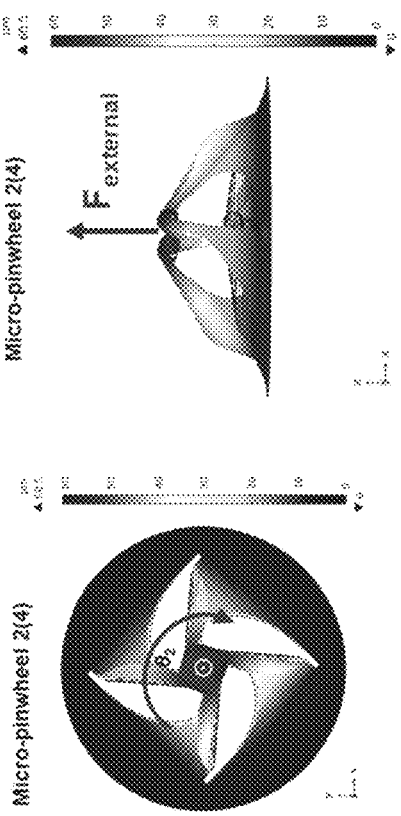
FIG. 9D
FIG. 9F

FABRICATION METHODS FOR 3D STRUCTURES BASED ON ROLLING-UP KIRIGAMI TECHNIQUES

TECHNICAL FIELD

The present disclosure relates generally to transforming two-dimensional films into three-dimensional structures. More specifically, the present disclosure provides fabrication methods for transforming two-dimensional films into three-dimensional structures based on rolling-up kirigami techniques.

BACKGROUND

Cross-dimensional transformation of two-dimensional (2D) thin films into three-dimensional (3D) structures, such as microstructures or nanostructures, has applications over a range of technologies. Compared to 2D planar architectures, 3D structures of thin film generally enhance the function of the device with which the 3D thin film structure is implemented, and a cross-dimensional approach can facilitate the simplification of patterning for forming the 3D thin film structure. Kirigami, an ancient art of paper cutting, is one typical method used for complex 3D thin film structure fabrication. Typical kirigami-based fabrication methods, however, leave room for improvement.

SUMMARY

The present disclosure provides new and innovative methods for fabricating 3D structures, such as microstructures or nanostructures, from 2D films (e.g., thin films) using a combination of kirigami and rolling-up (e.g., self-rolling) techniques, which may also be termed rolling-up kirigami. For example, a method is provided for fabricating 3D pinwheel structures having multiple segments that are formed based on patterning pre-stressed bilayer thin films such that the bilayer thin films, when released, self-roll into the 3D pinwheel structures. Designing the segments on a 2D bilayer thin film by forming a pattern in the 2D bilayer thin film facilitates the integration of microelement or nanoelement processes and other functionalization processes during the 2D patterning, which is less technically challenging than post-shaping an as-fabricated 3D structure by removing redundant materials or 3D printing.

The inventors simulated the dynamic self-rolling up process using elastic mechanics with a movable releasing boundary. Mutual competition and cooperation among the segments of the 3D pinwheel structure were observed during the whole release process. Additionally, the mutual conversion between translation and rotation offers a reliable platform for developing parallel microrobots and adaptive 3D micro-antennas. In addition, the inventors applied 3D chiral pinwheel arrays integrated into a microfluidic chip to detect organic molecules in solution using a terahertz (THz) apparatus, which indicates that, with an extra actuation, active 3D pinwheel structures can potentially serve as a base to functionalize 3D kirigami-based structures as tunable devices.

In an example, a method includes forming a first layer of a first material on a portion of a substrate, forming a second layer of a second material on the first layer and a second portion of the substrate, and forming a third layer of a third material on a first portion of the second layer. A pattern is formed into the third layer when forming the third layer. The example method further includes transforming at least a portion of the third layer into a three-dimensional structure based in part on removing a second portion of the second layer and at least a portion of the first layer.

In another example, a method includes forming a first material layer on a first portion of a substrate, forming a second material layer on the first material layer and a second portion of the substrate, forming a third material layer on a first portion of the second material layer. The first material layer includes aluminum. The second material layer includes silicon nitride. And the third material layer includes gold. A pinwheel-shaped pattern is formed into the third material layer when forming the third material layer. The example method further includes transforming at least a portion of the third material layer into a three-dimensional structure by removing a second portion of the second material layer and at least a portion of the first material layer thereby causing a plurality of third portions of the second material layer to deform and guide the third material layer into the three-dimensional structure.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

FIG. 5 is a table of displacement and rotation values resulting from a simulation of the central part of an example 3D micro-pinwheel structure, according to an aspect of the present disclosure;

FIGS. 9A-9D show top views and side views of the simulations of FIGS. 8C and 8D after an external upward force is applied to the example 3D micro-pinwheel structures, according to an aspect of the present disclosure;

FIGS. 9E and 9F are graphs of displacement and rotation angle, respectively, corresponding to the simulations of FIGS. 9A-9D, according to an aspect of the present disclosure;

DETAILED DESCRIPTION

Pre-stress plays a core role in the deformation process for film self-rolling into a 3D structure. Both molecular beam epitaxy (MBE) and chemical vapor deposition (CVD) can induce intrinsic stress in a film during the deposition process, but MBE or CVD are limited by the need for a substrate with matched lattices and a high temperature to grow the film. The present disclosure provides a 3D structure fabrication method based in part on rolling-up kirigami techniques that is not limited as such.

The provided fabrication method replaces local stress with global stress, and simplifies the process of obtaining stress (e.g., by using a silicon nitride film deposited by plasma-enhanced chemical vapor deposition (PECVD)). Additionally, the fabrication method is conducive to large-scale manufacturing and improves the processing efficiency and yield while also allowing for adjustability that enables a diverse array of three-dimensional structures to be obtained. The fabrication method also may involve traditional ultraviolet lithography technology for metal patterning, which aids in the efficiency with which the 3D structures can be fabricated. The fabrication method additionally does not require a complicated 3D manufacturing method. Kirigami techniques are also used in the fabrication method to pattern the stress layer such that the 3D structure can be obtained without complex release control during the release process.

FIGS. 1A-1H are a series of cross-sectional and perspective view representations illustrating the provided 3D structure fabrication method based in part on rolling-up kirigami techniques.

Figure 1A:
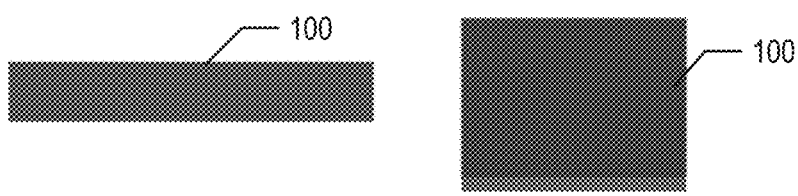
FIGS. 1A-1H are a series of cross-sectional and perspective view representations illustrating a 3D structure fabrication method based in part on rolling-up kirigami techniques, according to an aspect of the present disclosure.

In FIG. 1A, a substrate 100 is obtained. Substrate 100 may include silicon or another suitable substrate material. A surface of substrate 100 may be prepared using known techniques. For example, a silicon substrate 100 with a silicon oxide layer may be cleaned by successively soaking substrate 100 in acetone, rinsing substrate 100 in deionized water, and drying substrate 100 with a nitrogen gun. In some aspects of such examples, a photoresist material may be spin-coated on substrate 100, followed by a baking process.

Figure 1B:
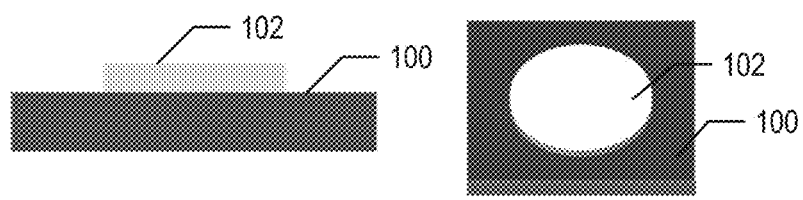

In FIG. 1B, a sacrificial material layer 102 is formed on substrate 100. In various aspects, sacrificial material layer 102 may be formed using electron-beam (e.g., e-beam) evaporation or another suitable process. In various aspects, sacrificial material layer 102 includes or consists of a suitable organic or inorganic material. For example, sacrificial material layer 102 may include aluminum, iron, copper, nickel, aluminum oxide, or a photoresist material. In this example, sacrificial material layer 102 is shaped as a circle, though may be other suitable shapes in other examples.

Figure 1C:
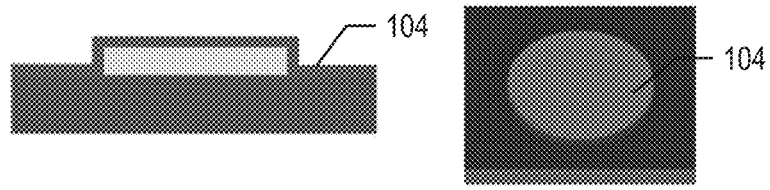

In FIG. 1C, a stress material layer 104 is formed on sacrificial material layer 102 and exposed portions of substrate 100. Stress material layer 104 is pre-stressed based on the deposition method used. In various examples, the stress material layer 104 is formed using vapor deposition, such as plasma-enhanced chemical vapor deposition (PECVD). In some aspects, the PECVD deposition is performed with a low operating frequency of the radio frequency power supply. In other examples, other suitable deposition methods may be used to form stress material layer 104, such as rapid evaporation of metal using electron beam evaporation. In various aspects, the stress material layer 104 includes or consists of silicon nitride, aluminum oxide (e.g., grown by atomic layer deposition), a suitable metal (e.g., deposited by e-beam evaporation), etc. Advantages of a silicon nitride film formed using PECVD include a large isotropic stress distribution, controllable tensile and compressive stresses, and bath fabrication, which matches well with semiconductor manufacturing process requirements. This controlled adjustment of stress/strain can be used to change the performance of the device. Additionally, low-temperature (e.g., 80° C.) PECVD can be compatible with inorganic materials and organic materials, which enables more opportunities for functionalization and changing stress distribution of the silicon nitride film.

Figure 1D:
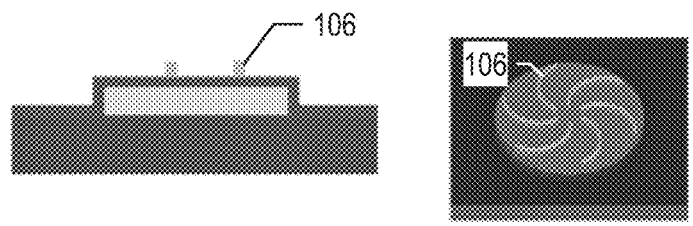

In FIG. 1D, a photoresist material 106 is formed on stress material layer 104 in accordance with a 2D pattern (e.g., pattern 110) that influences the final 3D structure.

Figure 1E:
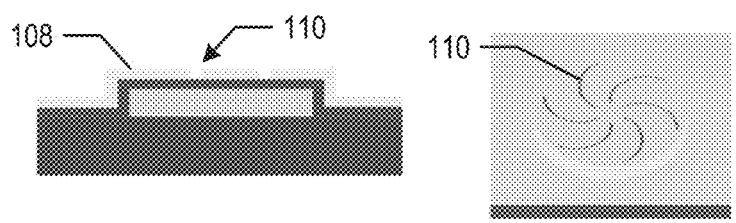

In FIG. 1E, a functional material layer 108 is formed on a portion of stress material layer 104 such that a pattern 110 is formed into functional material layer 108. Pattern 110 is formed based on photoresist material 106 that is thereafter removed. Pattern 110 includes multiple segments that are distinct from one another. For example, in the perspective view of FIG. 1D, the lead line of reference numeral 106 indicates a single segment of the multiple segments of photoresist material 106. In some examples, pattern 110 is based on a two-dimensional pinwheel-shaped pattern. In various aspects, functional material layer 108 may be formed using e-beam deposition or another suitable process. In various aspects, functional material layer 108 includes or consists of gold, silicon nitride, aluminum oxide, silicon dioxide, suitable metals, etc.

Figure 1F:
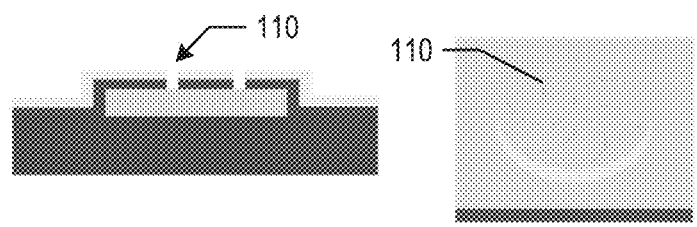

In FIG. 1F, a portion of stress material layer 104 that corresponds to pattern 110 is removed (e.g., etched). Stated differently, pattern 110 is etched into stress material layer 104. In an example, the portion of stress material layer 104 may be removed using sulfur hexafluoride gas under inductively coupled plasma (ICP).

Figure 1G:
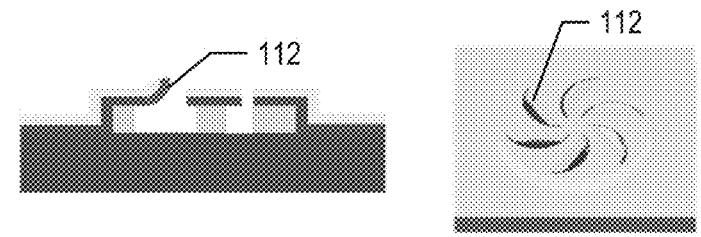
Figure 1H:
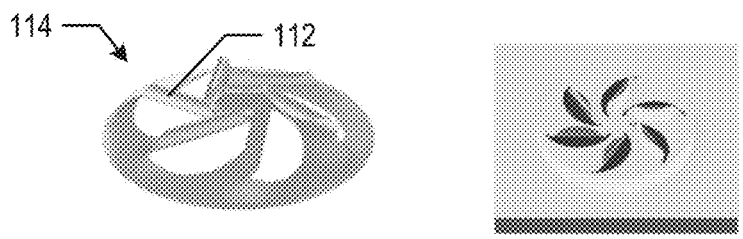

In FIG. 1G, at least a portion of (e.g., all of) sacrificial material layer 102 is removed (e.g., etched), which causes segments 112 of the bilayer film of stress material layer 104 and functional material layer 108 to deform by rolling up and away from substrate 100 such that the 2D film transforms into a 3D structure. For example, releasing stress material layer 104 from sacrificial material layer 102 enables stress material layer 104 of segments 112 to deform and guide functional material layer 108 of segments into a 3D structure. In an example, the at least a portion of sacrificial material layer 102 may be removed using an alkaline solution. In FIG. 1H, a final 3D structure 114 is shown free-standing (left) and coupled to substrate 100 (right). In this example, 3D structure 114 is a pinwheel-shaped 3D structure, though 3D structure 114 can take other forms in other examples. In some aspects, a supercritical drying process is performed to release residue stress (e.g., surface tension) in 3D structure 114. As is known in the art, supercritical drying, also known as critical point drying, is a process to remove liquid in a precise and controlled way. In an example, the supercritical drying process may be a carbon dioxide supercritical drying process.

In at least some aspects, the provided 3D structure fabrication method includes forming an adhesive material layer between two successive layers. For example, an adhesive material layer may be formed between substrate 100 and sacrificial layer 102 and/or between stress material layer 104 and functional material layer 108. In various aspects, the adhesive material layer may include or consist of chromium or other suitable materials.

The 3D structure fabricated by the provided method can be implemented with a variety of applications, such as smart sensors, adaptive antennas, active mechanical metamaterial, and parallel microrobots. In an example, 3D structure 114 may be a THz antenna that can be used in conjunction with a THz system for the detection of organic molecules (e.g., DNA). The 3D structure 114 may be tunable such that 3D structure 114 can be used for tunable THz antennas, thereby enhancing detection accuracy and range of the THz antenna. In another example, the adjustable 3D structure 114 with multiple segments can be used to make micro-parallel robots such that each segment can be regarded as a robot arm.

Figure 2:
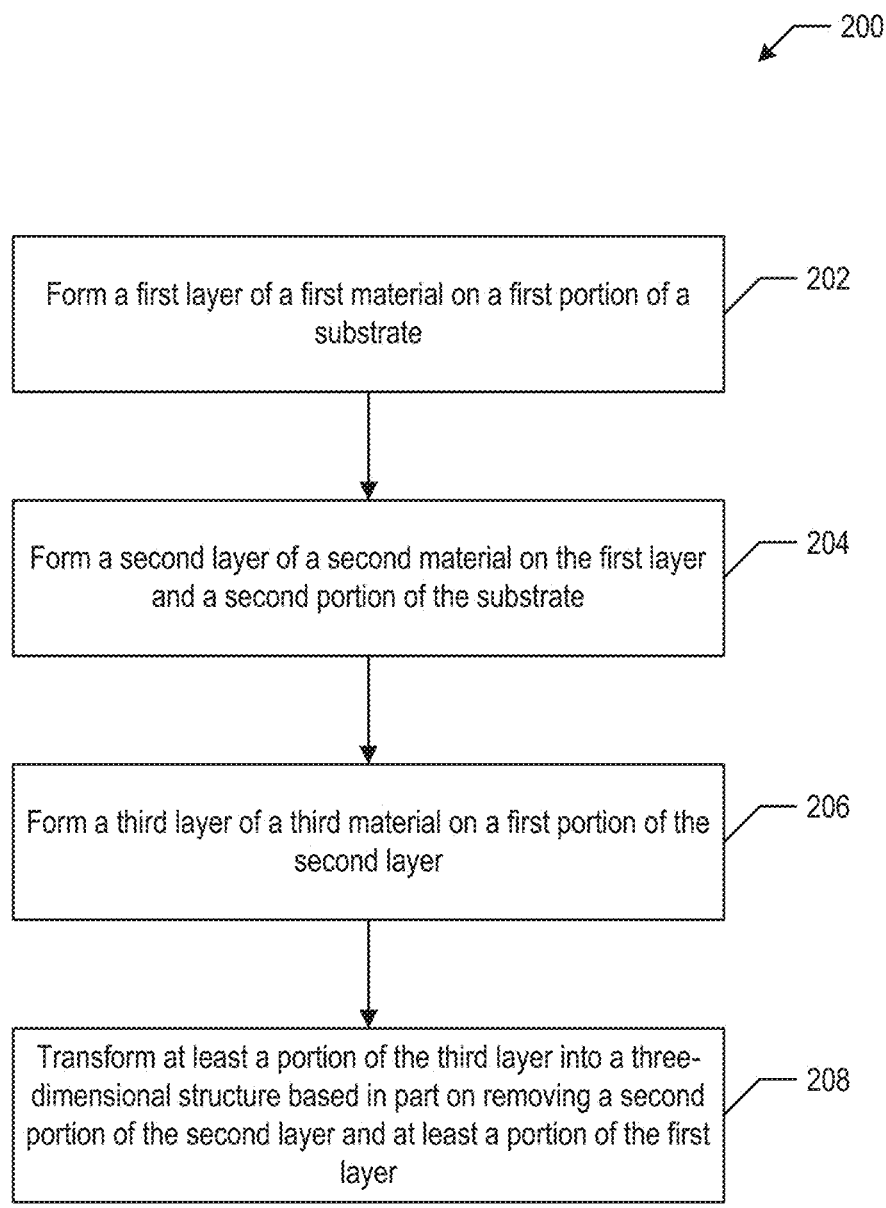
FIG. 2 is a flow chart of a 3D structure fabrication method based in part on rolling-up kirigami techniques, according to an aspect of the present disclosure.

FIG. 2 shows a flow chart of an example method 200 for 3D structure fabrication based in part on rolling-up kirigami techniques. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, additional blocks may be added, and some of the blocks described may be omitted.

Method 200 includes, at block 202, forming a first layer of a first material (e.g., sacrificial layer 102) on a portion of a substrate (e.g., substrate 100). In various aspects, the first material includes or consists of aluminum.

At block 204, a second layer of a second material (e.g., stress material layer 104) is formed on the first layer and a second portion of the substrate. In various aspects, the second layer is formed using vapor deposition, such as plasma-enhanced chemical vapor deposition (PECVD). In various aspects, the second material of the second layer includes or consists of silicon nitride.

At block 206, a third layer of a third material (e.g., functional material layer 108) is formed on a first portion of the second layer such that a pattern (e.g., pattern 110) is formed into the third layer when forming the third layer. For example, method 200 may include forming the pattern with a photoresist material on the second portion of the second layer prior to forming the third layer, and the pattern is formed into the third layer based on the photoresist material. In various aspects, the third material includes or consists of gold. In various aspects, the third layer is formed using e-beam evaporation. In various aspects, the pattern includes a plurality of segments that are distinct from one another. In various aspects, the pattern is based on a 2D pinwheel-shaped pattern.

At block 208, at least a portion of the third layer is transformed into a 3D structure (e.g., 3D structure 114) based in part on removing (e.g., etching) a second portion of the second layer and at least a portion of (e.g., all of) the first layer. The second portion of the second layer can be removed prior to removing the at least a portion of the first layer. In various aspects, the second portion of the second layer that is removed corresponds to the pattern. In an example, the second portion of the second layer is removed using a gas under inductively coupled plasma.

Removing the at least a portion of the first layer causes a plurality of third portions (e.g., stress material layer 104 portions of segments 112) of the second layer to deform and guide the third layer into the 3D structure. In an example, the at least a portion of the first layer may be removed using an alkaline solution. In some examples, the 3D structure is a pinwheel-shaped three-dimensional structure. In some examples, transforming the third layer into the 3D structure includes a supercritical drying process. In some examples, method 200 may include forming a fourth layer of a fourth material (e.g., adhesive material layer) on the second layer prior to forming the third layer. In various aspects, the fourth material includes or consists of chromium.

In at least some aspects, the 3D structure fabricated by method 200 can be applied to a dry working environment so as to be applicable for smart sensor, metamaterials, microrobots, and micro-antennas (e.g., adaptive antennas). In such aspects, the 3D pinwheel structures can be treated with the supercritical drying process.

The inventors analyzed the rolling-up process and structure regulation via an in-situ releasing process, theoretical simulations, and structural characterization that were carried out with pinwheel-shaped 3D structures having different numbers of distinct segments, layouts, chirality, curvature, and sizes of 2D patterns that result in the 3D structures. Owing to the synergistic effects between the distinct segments of the 3D structures, the displacement and rotation at the center of the 3D pinwheel structure were extracted to characterize the generation of translation and rotation motion. Additionally, a tunable 3D pinwheel structure with coupled translation and rotation motion under external force stimulus was analyzed via simulation for developing parallel microrobots and adaptive 3D micro-antennas. For instance, the deformation and displacement of the 3D pinwheel structure were observed by pressing down on the 3D pinwheel structure with a tungsten probe inside a scanning electron microscope (SEM). With the size on the hundred-micron scale, the response wavelength of the 3D pinwheel structure within the terahertz (THz) range was demonstrated for organic molecule detection. Such active 3D pinwheel structures can have wide application in regulating the peak value and the response wavelength in the THz range.

In-situ observation of the release process for the 2D segment structures of the film is beneficial to intuitively understanding the evolution process of the 3D structure during the rolling-up process. In the example provided herein, the silicon nitride film detached from the substrate when the aluminum layer was etched by an alkaline solution, accompanied by an upward bending of the silicon nitride film. The generation of force couples and a non-equilibrium bending moment between the silicon nitride layer and the gold layer cause the whole rolling-up process. Aided by the force and the bending moment, the accumulative energy U at the newly released regions of the silicon nitride layer stemming from the strain will increase. Furthermore, this accumulative energy increases enough to alter the historical geometric morphology. The strain energy can be calculated by the following equation for a bilayer film, in which the superscripts b and t represent the bottom silicon nitride film and top gold film, respectively; $\sigma$ and $\varepsilon$ represent the stress and strain of the bilayer film, respectively; and V represents the volume of the bilayer film.

$$U = \iiint_V \left(\frac{1}{2}\sigma^b_{ij}\varepsilon^b_{ij} + \frac{1}{2}\sigma^t_{ij}\varepsilon^t_{ij}\right) dV, \quad (1)$$

It can be found that the bilayer film strain energy is proportional to the bilayer film volume. Thus, the accumulative energy U is directly related to the area of the newly released portions of the bilayer film. With the increased released area, mutual competition and cooperation will occur for structural regulation.

Figure 3A:
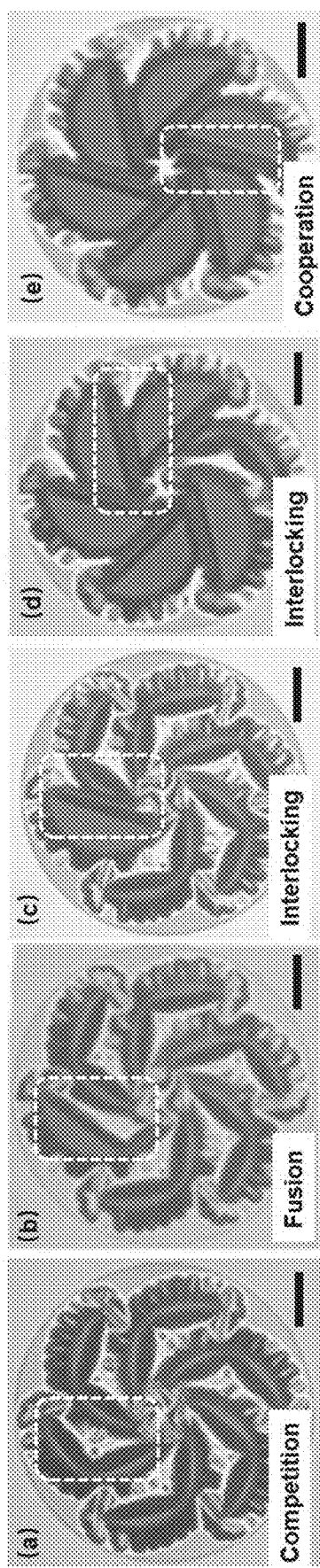
FIG. 3A is a flow diagram of high-magnification microscope images showing a successive release process of an example 3D micro-pinwheel structure, according to an aspect of the present disclosure.

FIG. 3A is a flow diagram of high-magnification microscope images showing a successive release process of an example 3D micro-pinwheel structure from stage (a) to stage (e). The scale bar is equal to 50 micrometers. The inventors observed that there were three significant release stages that help structures maintain a quasi-stable state in the release process: (1) competition during the formation evolution of individual 3D segments, (2) fusion during the formation evolution of individual 3D segments and (3) cooperation among 3D segments. At the competition stage (a), two rolling-up directions occurred in a single segment owing to the priority etching order in the circular direction of designed arc patterns. Such competition in two rolling-up directions resulted in two sub-segment morphology. The fusion process of the two sub-segments at stage (b) will enhance roughly along the normal direction of designed arc patterns with the increased release area, and rolling up in this direction will lead to a great inhibition in another direction. Then, the fusion process at stage (c) finished with the constraints of the outer circle and center linking region, enabling interlocking that attains a complete single segment. As the etching process continued at stage (d), six segments were gradually released. Once the six segments are released, at stage (e), cooperation phenomenon among the six segments can be obtained, thereby realizing a 3D pinwheel structure.

Figure 3B:
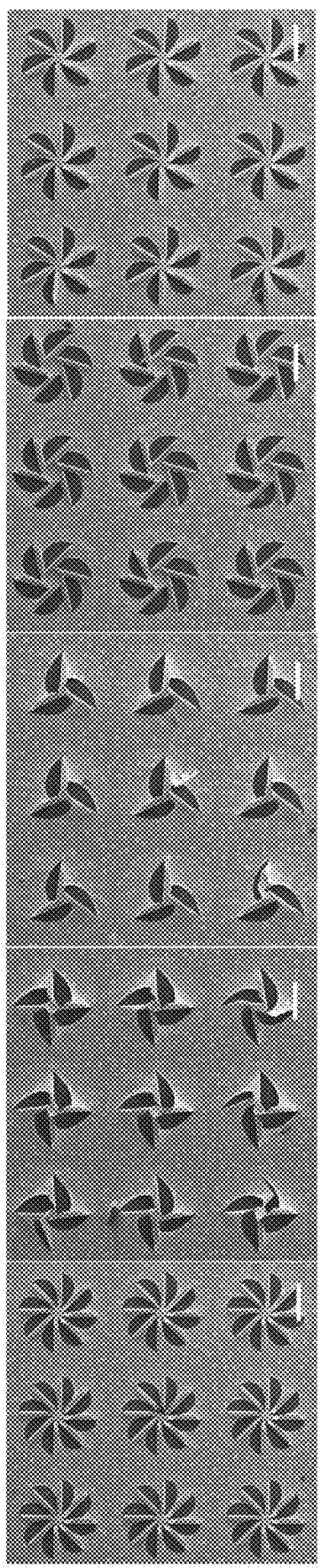
FIG. 3B shows SEM images of various 3D micro-pinwheel structures after supercritical drying process, according to an aspect of the present disclosure.

In such an interlocking architecture as shown in stages (c) to (e), one side of each of the six segments will gather around the center linking region, and the other side of each of the six segments will be fixed at the outer circle. Additionally, the fusion process will be influenced by the geometry of the designed arc patterns. The 3D pinwheel structure may maintain this dual-axis rolled-up state since it was already balanced such that the two states were simultaneous. This phenomenon is attributed to the fact that the smaller rolling-up patterns cannot offer enough energy for the fusion of the two sub-segments, eventually making the two sub-segments always maintain. Therefore, the inventors observed that mutual competition, interlocking, and cooperation always exist in the whole rolling-up process, abiding the rolling-up process with the pre-designed release pattern. As described previously, in at least some aspects, the 3D pinwheel structure can be applied to a dry working environment so as to be applicable for metamaterials, microrobots, and micro-antennas. In such aspects, the 3D pinwheel structures can be treated with a supercritical drying process. FIG. 3B shows five SEM images of 3D pinwheel structures that were treated via a carbon dioxide ($CO_2$) supercritical drying process to eliminate the effect of surface tension. The scale bar is equal to 100 micrometers. The SEM images indicate that the 3D pinwheel structures are stable in a dry working environment.

The inventors additionally investigated the competition and influence mechanisms between frameworks by carrying out a transient quasi-static rolled-up deformation simulation of the silicon nitride film based on first-order shear deformation theory (FSDT) and moving boundary in each simulation cycle. FSDT belongs to the equivalent single layer (ESL) theory, which still treats the model as a plane stress problem ($\sigma_z=0$) owing to the thickness of the silicon nitride film in the z-direction being far less than in the other two directions. The simulation included multiple advantages. Directly setting the pre-strain of a film with positive or negative value represented the tensile or compressive strain, respectively, which satisfied the actual membrane strain distribution and demonstrated that the simulation simulated intrinsic real structural mechanics. Additionally, multiple-layer shell elements were used for models with nanometer thickness, which simplified the simulation models and improved the convergence. Another advantage included that the large deformation process could be decomposed into the small deformation processes in each simulation cycle by automatically selecting released regions along with the moving boundary, which also approved convergence. In addition, the simulation enabled the immediate deformation processes to be exported for a better understanding of the deformation mechanisms.

Figure 4A:
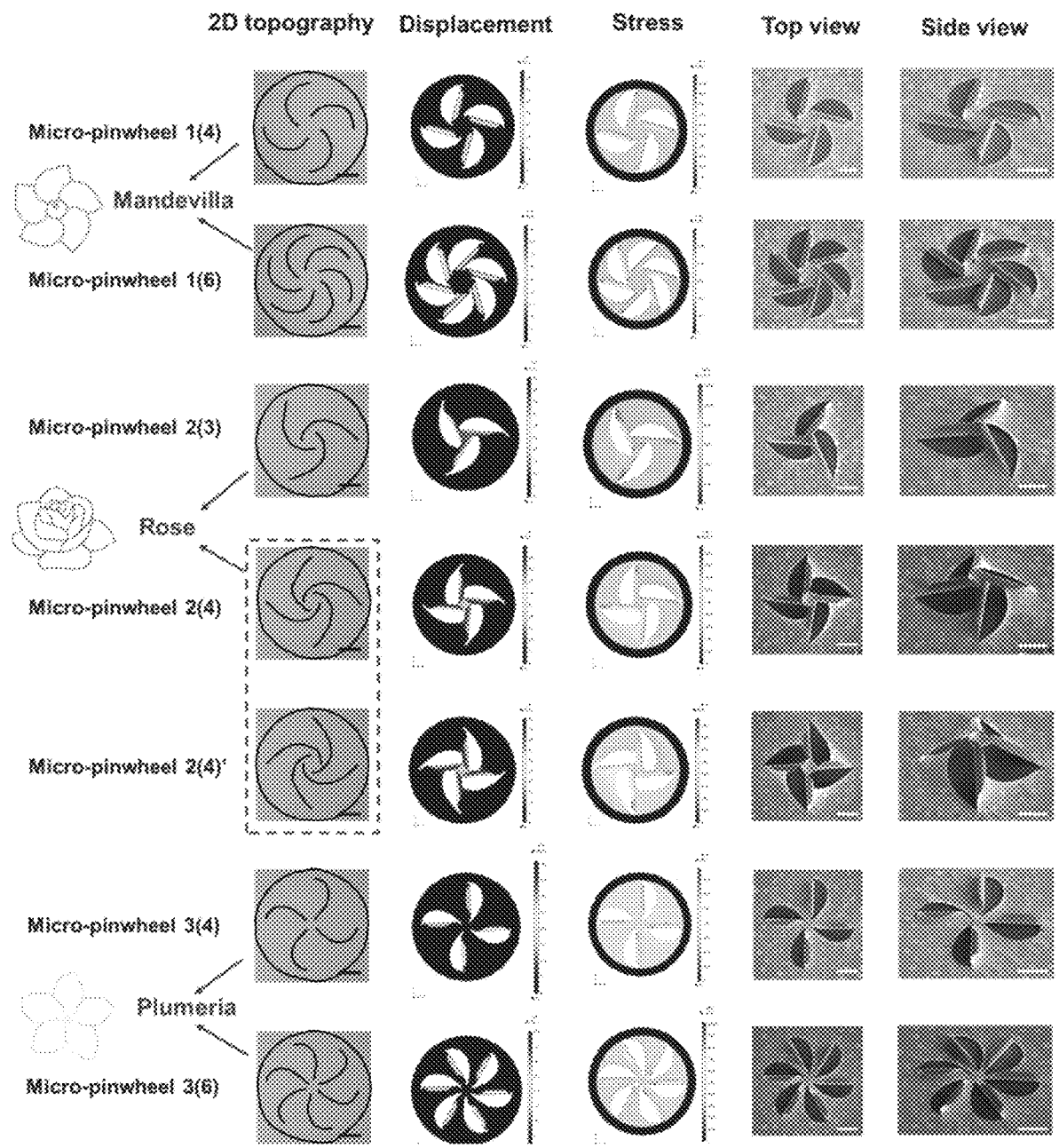
FIGS. 4A and 4B show displacement and stress distributions of 3D micro-pinwheel structures formed from various 2D topographies in comparison to SEM images of those 3D micro-pinwheel structures, according to an aspect of the present disclosure.
Figure 4B:
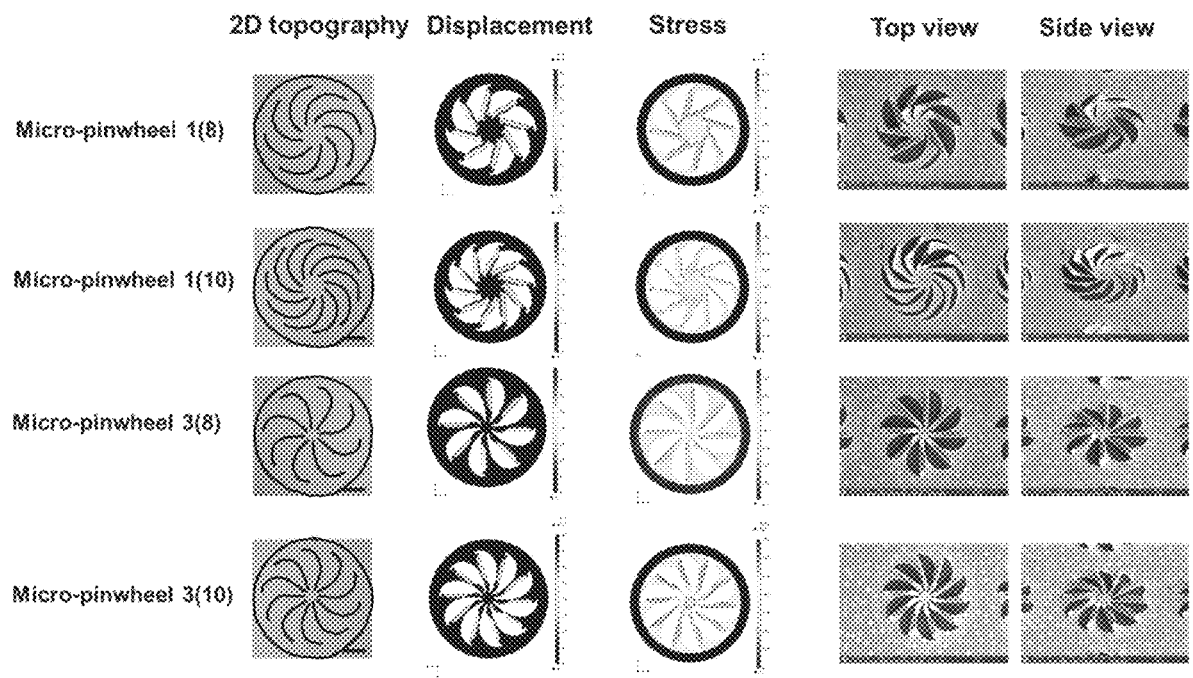

The inventors simulated 3D pinwheel structures (e.g., 3D micro-pinwheel structures) for understanding the structural evolution process. FIGS. 4A and 4B show displacement and stress distributions of various 2D topography micro-pinwheel patterns, and in comparison, top and side view SEM images. The scale bar in the SEM images is 50 micrometers. The inventors observed that the 3D micro-pinwheel structures obtained from the rolling-up technology were affected by the number of segments, the layout of the curve, the chirality of the 2D patterns, the curvature, and the size of the 2D pattern. For instance, taking micro-pinwheel 2(4) as an example, the first and second numbers represent the type of curve and the number of curves in a single pattern, respectively. Micro-pinwheel 2(4)' means it has a different orientation from micro-pinwheel 2(4). In the simulations, the micro-pinwheel included two layers with the bottom layer being LF $Si_xN_y$ and the top layer being Au (Young's modulus was 79 GPa). The pre-strain settings for LF $Si_xN_y$ and Au membrane were 0.25% and −0.25%, respectively, and the thickness was 40 nm for both layers. Additionally, in the simulations, the outer circle was always fixed, all the segments were simultaneously released, and the central linking regions or also loaded with the same pre-strain. Mutual competition, inhibition, and cooperation among segments were considered in the simulation with the central regions as linking parts.

The number of segments directly determined the area of a single segment. Under the same circle region, more segments lead to a smaller area of a single segment. With the isotropic etching process in all directions, a smaller area will facilitate the faster release of segments. Additionally, increasing the number of segments also led to a decrease in the connection area between a single segment with the central part, eventually reducing the connection strength. Meanwhile, cooperation stemming from a large pull force with segments will weaken the deformation of the central linking part as shown in the table of FIG. 5. The displacement, estimated from the side view of SEM images in FIG. 4A, of micro-pinwheel 2(4) is larger than that of micro-pinwheel 2(3), which is about 42 μm and 20 μm, respectively, due to the stronger cooperation effect among segments of micro-pinwheel 2(4). Considering the overall shape, the rolled-up frameworks are dominated by the interlocking of all segments along with the axial direction of a single segment and are equivalent to a circular array of individual segments.

The layout of the curve directly influenced the final morphology of the 3D micro-pinwheel structure. Mutual competition and cooperation were especially apparent during the isotropic released process when it analyzing the effect of curve layout of the various 2D patterns. FIG. 4A shows the 3D final morphologies corresponding to three completely different layouts of curves. Owing to the obvious intersection of rose patterns at the central linking region, the interference phenomenon happened in the final rolling-up constructions, as shown in FIG. 4A (e.g., micro-pinwheel 2(3) and 2(4)). By contrast, there is no such interferential phenomenon in other patterns of FIG. 4A, attributed to the independent mandevilla (e.g., micro-pinwheel 1(4) and 1(6)) and plumeria (e.g., micro-pinwheel 3(4) and 4(6)) patterns. Additionally, the layout of the curve also gives rise to the different displacements of the central part (e.g., as seen in the table of FIG. 5), owing to the cooperation effects among segments. Especially, the displacement in the z-direction can be observed in micro-pinwheel 2(3) and micro-pinwheel 2(4) of FIG. 4A. This phenomenon indicates that the force from cooperation is sufficient to meet the application requirement of 3D micro-pinwheel structures in a dry environment.

The 3D micro-pinwheel structure is a chiral structure such that it cannot overlap with its mirror image. And a 3D micro-pinwheel structure with different chirality (e.g., right- or left-handed chirality) is beneficial for the modulation of electromagnetic wave transmission, so machining and studying the chirality of the micro-pinwheel structures will greatly expand their applications in 3D antennas. Here, the enantiomorphs of the 3D micro-pinwheel structure can be easily achieved by only changing the chirality of the 2D topography patterns, as shown in micro-pinwheel 2(4) and micro-pinwheel 2(4)' in FIG. 4A. The whole releasing process of the 3D micro-pinwheel structures with the same layout of the curve are identical, on account of the isotropic stress distribution, providing a simple way to build more diverse architectures.

To investigate the effect of the curvature of the 2D micro-pinwheel pattern on the 3D micro-pinwheel structure, the 2D micro-pinwheel patterns with fixed and varied curvature radii r were compared between FIG. 4A and FIG. 4B. Two different curvature distributions along the initial arc of each segment were designed to investigate the curvature effect. The 2D micro-pinwheel patterns 1(4), 1(6), 1(8), and 1(10) were designed with the fixed curvature radius (r=50 μm) along the initial arc of each segment. However, the curvature radius of the initial arc of each segment in the 2D micro-pinwheel patterns 3(4), 3(6), 3(8), and 3(10) gradually increase from center to an edge of the 2D patterns. For the fixed curvature radius, the segments at the initial status is symmetric, leading to the symmetric mutual competition effect. With an increase of the number of segments, the mutual competition effect becomes stronger due to the generation of a dual-axis rolled-up state, which is not conducive to the subsequent fusion process. The bidirectional rolling-up behavior is always maintained after supercritical drying process, as shown in the 2D micro-pinwheel patterns 1(8) and 1(10) of FIG. 4B. By contrast, a gradually increasing curvature distribution can completely break the rolling-up symmetry, enabling a single-direction rolling-up behavior even in the case of a 2D micro-pinwheel with more segments, as shown in the 2D micro-pinwheel patterns 3(8) and 3(10) of FIG. 4B. Therefore, the inventors found that the curvature distribution played an important role in the formation of a 3D micro-pinwheel structure with reliably repeatable segments.

Figure 6:
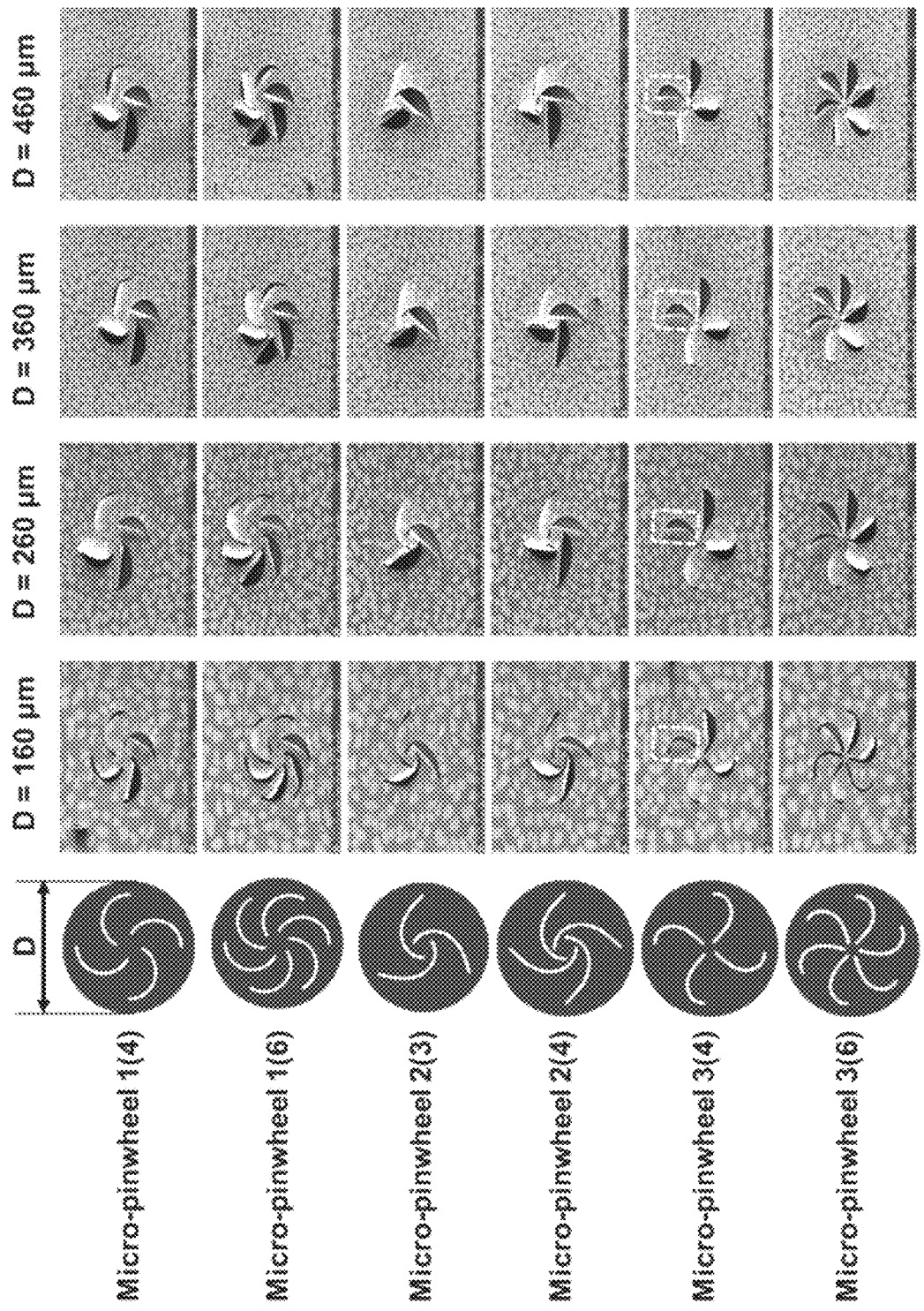
FIG. 6 shows the representations of various 3D micro-pinwheel structures and SEM images corresponding to various sacrificial layer diameters of each 3D micro-pinwheel structure, according to an aspect of the present disclosure.

The size or scaling effect was also investigated by only changing the diameter D of the sacrifice layer for fabricating the 3D micro-pinwheel structure from 160 μm to 460 μm with equal proportion increases, as shown in FIG. 6. The rolling-up level of segments gradually increased with the increased sacrifice layer size in all 3D micro-pinwheels structures, which is demonstrated by the dashed rectangles shown for micro-pinwheel 3(4). The relationship between the rolling-up level and sacrifice layer size demonstrated that the present fabrication process can be applied to 3D micro-pinwheel structures at various scales. In addition, the different deformation morphology of the final 3D micro-pinwheel could be attributed to the different deformation energy from the free-releasing segment regions. The larger area of free-releasing segment regions, the more deformation energy releasing. Thus, the size or scaling effect of 2D micro-pinwheel patterns can provide more choices of 3D complex structures with the geometry dimension from sub-millimeter to micron scale.

Figure 7:
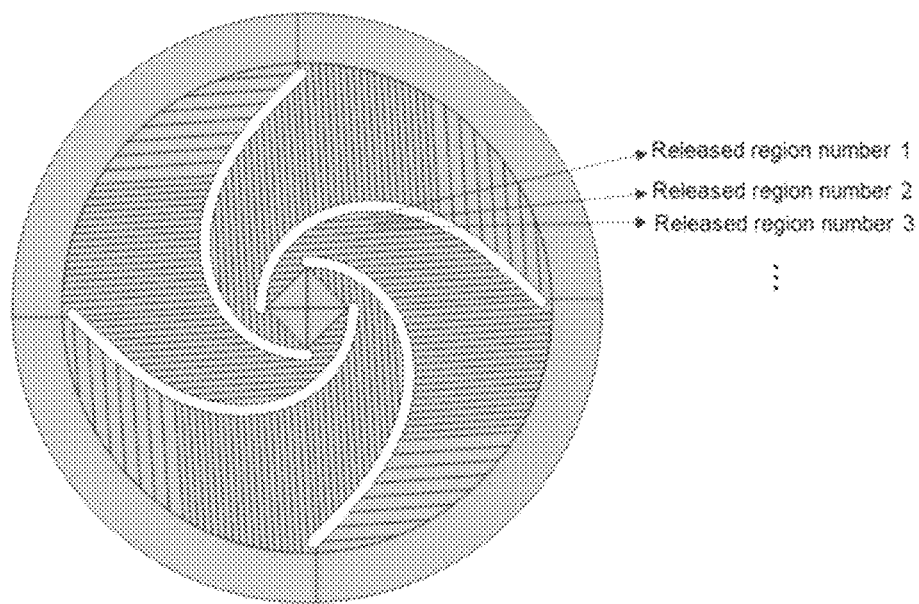
FIG. 7 is a 2D thin film showing ordered release regions when the 2D thin film rolls us into a 3D micro-pinwheel structure, according to an aspect of the present disclosure.
Figure 8A:
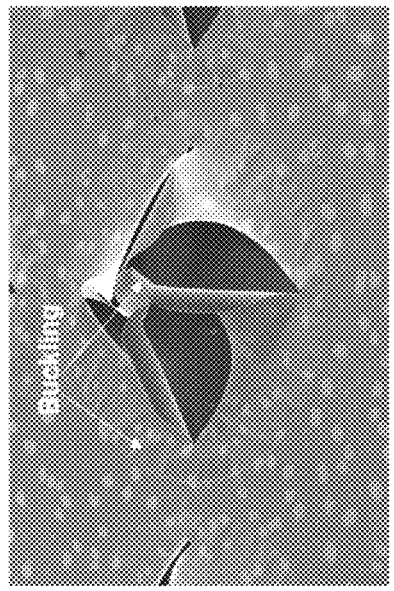
FIG. 8A is a schematic diagram of a force analysis for an example 3D micro-pinwheel structure under a release process, according to an aspect of the present disclosure.
Figure 8B:
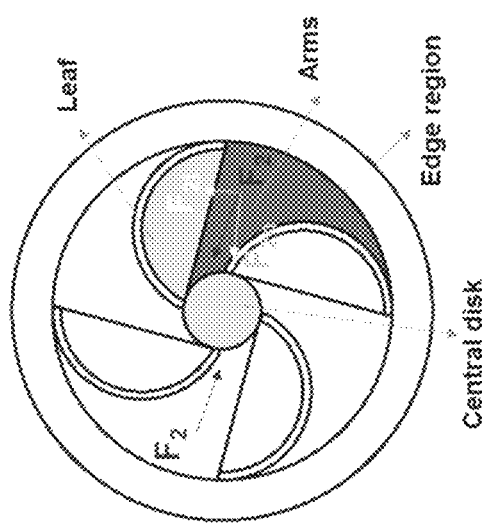
FIG. 8B is a SEM image showing a buckling phenomenon demonstrated by an example 3D micro-pinwheel structure, according to an aspect of the present disclosure.
Figure 8C:
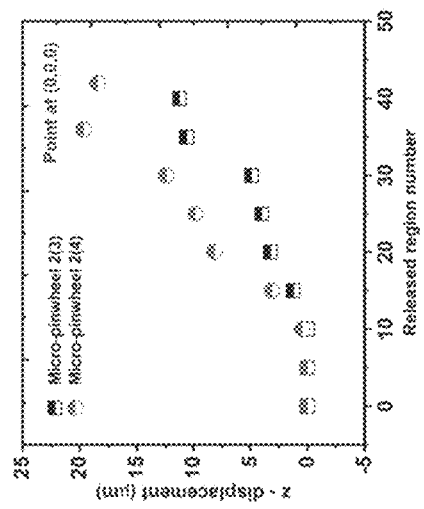
FIGS. 8C and 8D are side views of simulations of two example 3D micro-pinwheel structures, according to an aspect of the present disclosure.
Figure 8D:
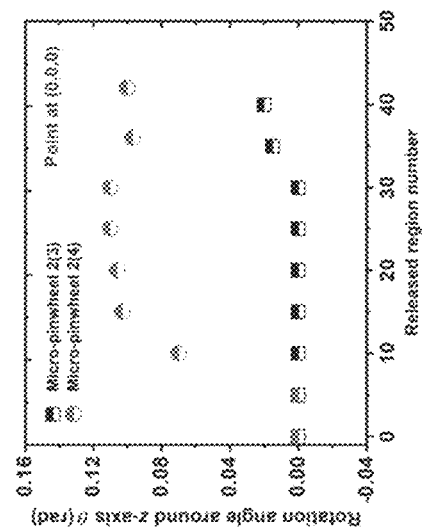
Figure 8E:
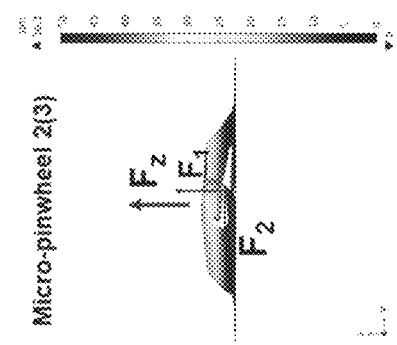
FIGS. 8E and 8F are graphs of displacement and rotation angle, respectively, corresponding to the simulations of FIGS. 8C and 8D, according to an aspect of the present disclosure.
Figure 8F:
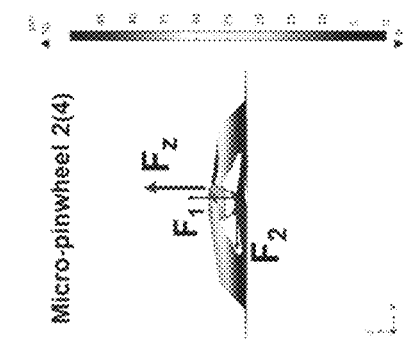

The inventors additionally investigated deformation level by investigating displacement and rotation of 3D micro-pinwheel structures during the release process. FIG. 8A shows a force analysis of an example 3D micro-pinwheel structure. The central disk and the legs, or the quasi-triangular membrane surrounding them, can be considered as a beam supported on the substrate with the junction or the connection part between the central disk and the legs serving as a hinge or a joint. FIG. 8B shows a SEM image of a buckling phenomenon. A lifting process of micro-pinwheel 2(3) and micro-pinwheel 2(4) were confirmed by simulations, as shown in FIGS. 8C and 8D, respectively. The z-direction displacement can be comprehended that an upward net force $F_z$ at the center of the micro-pinwheel is formed via a vertically upward component force $F_1$ in each segment. This vertically upward component force $F_1$ comes from the support of arms. Furthermore, a slight rotation process was also demonstrated by the simulation. The inventors attributed this phenomenon to an equivalent force of $F_2$ in the circulating direction in the arm region, supporting a strong rotating power. The z-displacement and rotation angle θ around the z-axis are plotted with the increase of released region number as depicted in FIGS. 8E and 8F, respectively. The released region number means the number of released elements coming from the moving boundary that decomposes the large deformation into the small deformation process during the simulation. For example, FIG. 7 is a schematic of micro-pinwheel 2(4) that shows a sequence of elements releasing in which the film rolled up according to the increasing sequence of released region number.

A similar increased tendency of z-displacement was seen during the whole release process, which is 18.43 μm and 11.23 μm, respectively, after full release. For the rotation, the generation of the rotation angle θ in micro-pinwheel 2(4) was much earlier than that in micro-pinwheel 2(3). Meanwhile, the rotation angle (θ=0.1 rad) of micro-pinwheel 2(4) was four times larger than that of micro-pinwheel 2(3) (θ=0.02 rad), supporting that cooperation can be more striking via the increase of the segment number. Additionally, the inventors investigated the above phenomenon by the residual strain energy density distribution of micro-pinwheel 2(3) and micro-pinwheel 2(4). Once the film was released, the residual strain energy density decreased. Smaller residual strain energy density corresponded to a larger rolling-up degree. The residual strain energy density of micro-pinwheel 2(4) was smaller than that of micro-pinwheel 2(3), resulting from the difference in the arm region. Therefore, a larger rolling-up degree was observed in micro-pinwheel 2(4), eventually manifesting a tremendous cooperation effect.

A tunable framework under the external stimulus is an essential building block for smart systems. The source of this external stimulus can be an electrostatic field, magnetic field, optical field, and thermal field, enabling a load on the designed configurations to cause the second deformation of the structure. Such second deformation can be related to the external environment and can be applied for environmental monitoring. As a result, the inventors investigated the second enhancement transformation of the rolling-up micro-pinwheel with an external stimulus for applications in smart sensors or adaptive antennas.

Figure 10:
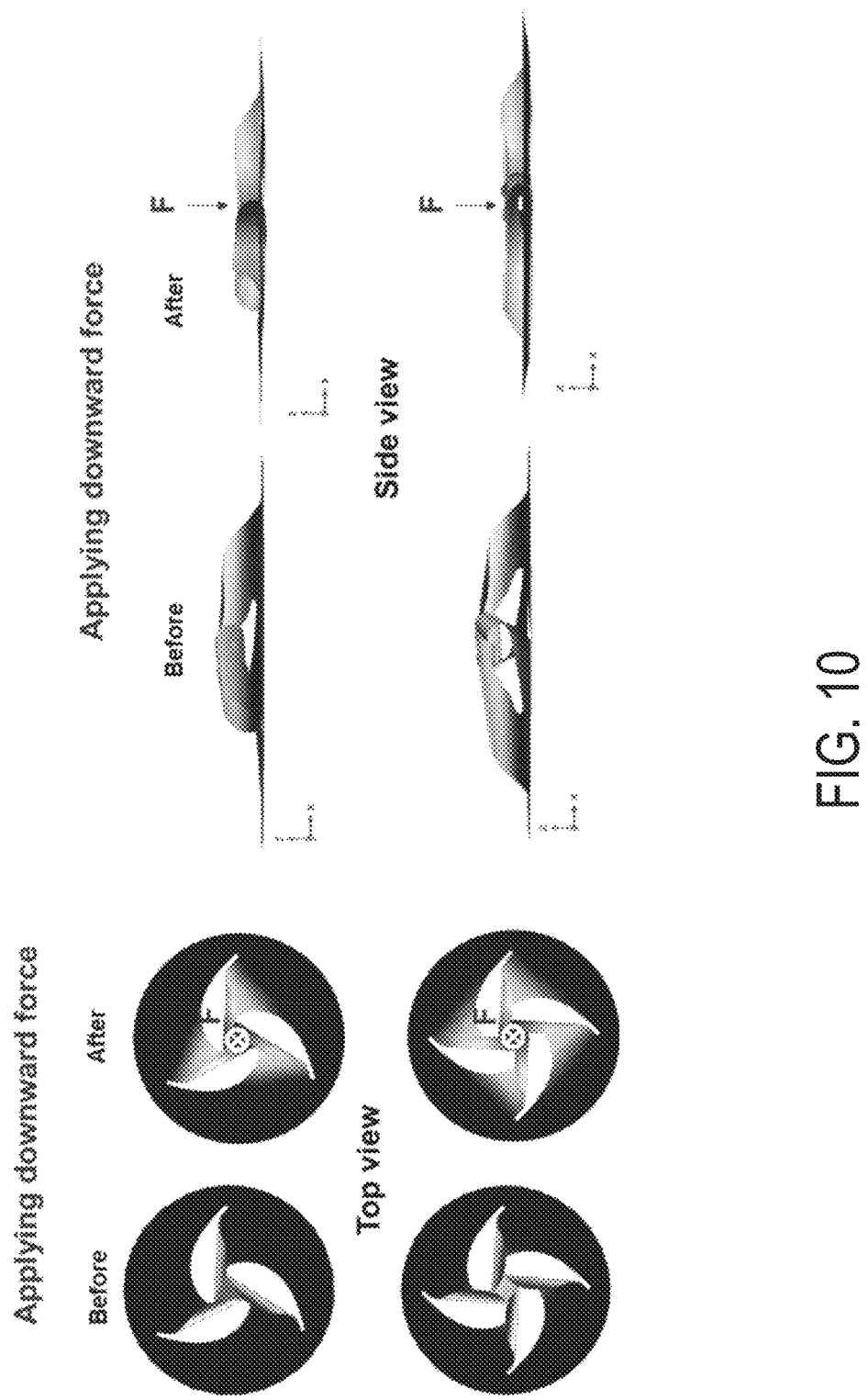
FIG. 10 shows top views and side views of the simulations of FIGS. 8C and 8D after an external downward force is applied to the example 3D micro-pinwheel structures, according to an aspect of the present disclosure.

An external force F along with the z-direction was applied on the central part of the micro-pinwheel, inducing a secondary immense deformation. FIGS. 9C to 9F show results of an upward force while FIG. 10 shows results of a downward force. Under the applied external force, rotation motion also can be achieved, as shown in FIGS. 9A and 9B. Here, each micro-pinwheel can be an analogy to the joint of a parallel microrobot. Thus, the emergence of a larger rotation angle will be supported by the synergistic effect of all rolling-up flabella. As shown in FIGS. 9C and 9D, both micro-pinwheel 2(4) and micro-pinwheel 2(3) demonstrated second displacement once the external force is applied. Under the external force of 2 μN, the displacement reached 53.7 μm and 33.1 μm for micro-pinwheel 2(4) and micro-pinwheel 2(3) respectively, illustrating that the second displacement of micro-pinwheel 2(4) is larger than that of micro-pinwheel 2(3), as shown in FIG. 9E. The stiffness K, defined by the ratio between the external force and displacement, is shown in FIG. 9E for both micro-pinwheel 2(4) and micro-pinwheel 2(3). The stiffness of micro-pinwheel 2(4) ($K_2=0.037$ N m$^{-1}$) is slightly smaller than that of micro-pinwheel 2(3) ($K_1=0.060$ N m$^{-1}$), manifesting that micro-pinwheel 2(4) exhibits a more flexible feature. It is on the same order of magnitude as the relatively flexible atomic force microscopes (AFM) cantilever (0.03 N m$^{-1}$). Two main factors account for this small stiffness, one is the nano-thickness film, and another is the micro-pinwheel was a static-indeterminate structure. Meanwhile, the inventors observed that micro-pinwheel 2(4) will rotate, coupled with the translation motion, showing a Kresling-shape-like motion, as shown in FIG. 9F. Therefore, the magnitude of the displacement can be deduced from the angle of rotation, transforming the difficult-to-observe vertical motion into a visual plane rotational motion.

Additionally, micro-pinwheel 2(4) was pressed down and recovered during the moving up and down process of a tungsten probe inside SEM. Initially, the probe and micro-pinwheel 2(4) were stationary and have no contact with each other. Once contact occurred between the probe and the micro-pinwheel, a reliable press force was applied at the central region of the micro-pinwheel accompanied by the tungsten probe moving downward. Then, a dynamic deformation process happened, and the displacement enlarged to about 7.6 μm. Subsequently, the probe moved upward, and the structure gradually returned to the initial state. Compared with the 3D framework before manipulation, the recovered micro-pinwheel, attributing to the deformation being elastic, remained the same as the original state, supporting feasibility of the micro-pinwheel as a tunable 3D architecture, such as active mechanical metamaterial and parallel microrobots.

THz spectroscopy has been used in various territories due to its unique features, such as telecommunication and sensors. THz spectroscopy is also applied in the analysis and detection of biological samples owing to its ability of label-free, non-contact, and non-invasive detection. Typical THz micro-antennas concentrate on 2D patterns stacking layer by layer to improve the micro-antennas' performance, and not complex 3D architectures. The inventors demonstrated that the present 3D micro-pinwheel structures can be applied for the detection of organic molecules under the THz spectra. Combining a microfluidic chip and 3D micro-pinwheel functions was shown to be an effective tool to improve the signal-to-noise of detection, allowing the THz waves to penetrate through the sample with minimal absorption.

Figures 11A, 11B:
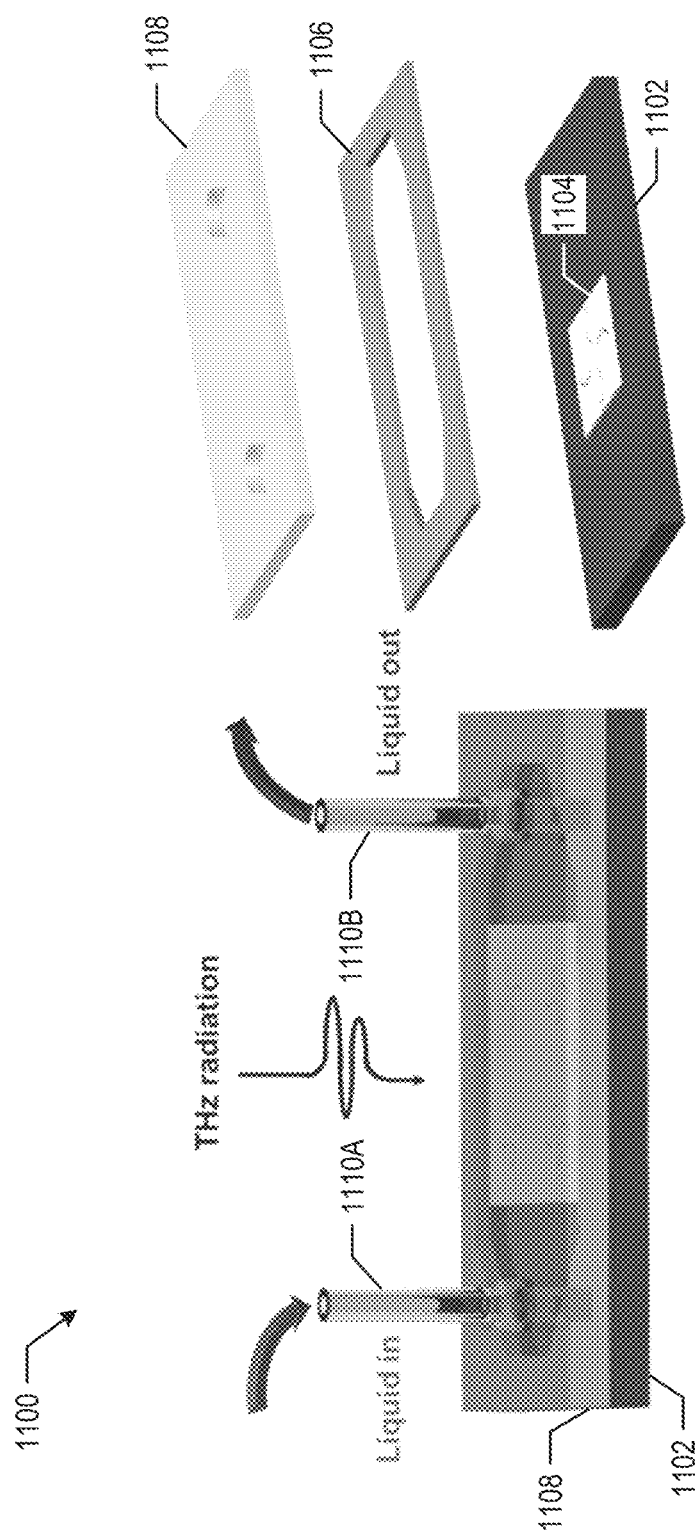
FIGS. 11A and 11B are a perspective view and exploded view, respectively, of a microfluidic device, according to an aspect of the present disclosure.

FIGS. 11A and 11B are a perspective view and exploded view, respectively, of a microfluidic device 1100. The microfluidic device 1100 includes a substrate 1102 and a self-rolling 3D structure 1104 fabricated on a substrate 1102. An adhesive 1106 couples a plate 1108 to the substrate 1102. In various aspects, the adhesive 1106 may be double-sided tape. In various aspects, the plate 1108 may be constructed of a material including or consisting of poly(methyl methacrylate) (PMMA), polycarbonate (PC), cyclic olefin polymers (COP), cyclic olefin copolymers (COCs), or Thiol-ene polymers (TEs). The microfluidic device 1100 may additionally include an input port 1110A and an output port 1110B. The input port 1110A and output port 1110B may be coupled to or integrated with the plate 1108. The solution being tested flows into the input port 1110A and out the output port 1110B. THz transmission signals pass through the microfluidic device 1100 as shown in FIG. 11A.

As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number.

Furthermore, all numerical ranges herein should be understood to include all integers, whole or fractions, within the range, inclusive of the ends of the ranges. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The above specification provide a complete description of the structure and use of illustrative embodiments of this invention. Although certain embodiments have been described above with a certain degree of particularity, or with reference to one or more individual embodiments, those of ordinary skill in the art could make numerous alterations to the disclosed embodiments without departing from the scope of this invention. As such, the various illustrative embodiments of the present apparatuses and methods are not intended to be limited to the particular forms disclosed. Rather, they include all modifications and alternatives falling within the scope of the claims, and embodiments other than those shown may include some or all of the features of the depicted embodiment. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

What is claimed is:

1. A method comprising:
   forming a first layer of a first material on a first portion of a substrate;
   forming a second layer of a second material on the first layer and a second portion of the substrate;
   forming a third layer of a third material on a first portion of the second layer, wherein a pattern based on a two-dimensional pinwheel-shaped pattern is formed into the third layer when forming the third layer; and
   transforming at least a portion of the third layer into a three-dimensional structure based in part on removing a second portion of the second layer and at least a portion of the first layer.

2. The method of claim 1, wherein removing the at least a portion of the first layer causes a plurality of third portions of the second layer to deform and guide the third layer into the three-dimensional structure.

3. The method of claim 1, further comprising forming the pattern with a photoresist material on the second portion of the second layer prior to forming the third layer, wherein the pattern is formed into the third layer based on the photoresist material.

4. The method of claim 1, wherein the second portion of the second layer that is removed corresponds to the pattern.

5. The method of claim 1, wherein the second portion of the second layer is removed prior to the at least a portion of the first layer.

6. The method of claim 1, wherein the pattern includes a plurality of segments that are distinct from one another.

7. The method of claim 1, wherein the three-dimensional structure is a pinwheel-shaped three-dimensional structure.

8. The method of claim 1, wherein the first material includes aluminum.

9. The method of claim 1, wherein the second material includes silicon nitride.

10. The method of claim 1, wherein the third material includes gold.

11. The method of claim 1, wherein the second layer is formed using vapor deposition.

12. The method of claim 1, wherein the third layer is formed using e-beam evaporation.

13. The method of claim 1, wherein the second portion of the second material layer is removed using a gas under inductively coupled plasma.

14. The method of claim 1, further comprising forming a fourth layer of a fourth material on the second layer prior to forming the third layer, the fourth layer acting as an adhesive between the second and third layers.

15. The method of claim 1, wherein the three-dimensional structure is a chiral structure.

16. A method comprising:
    forming a first material layer on a first portion of a substrate, the first material layer including aluminum;
    forming a second material layer on the first material layer and a second portion of the substrate, the second material layer including silicon nitride;
    forming a third material layer on a first portion of the second material layer, the third material layer including gold, wherein a pinwheel-shaped pattern is formed into the third material layer when forming the third material layer; and
    transforming at least a portion of the third material layer into a three-dimensional structure by removing a second portion of the second material layer and at least a portion of the first material layer thereby causing a plurality of third portions of the second material layer to deform and guide the third material layer into the three-dimensional structure.

17. The method of claim 16, wherein the second material layer is formed using vapor deposition, and the third material layer is formed using e-beam evaporation.

18. The method of claim 16, wherein the second portion of the second material layer is removed prior to the at least a portion of the first material layer.

19. The method of claim 16, wherein the second portion of the second material layer that is removed corresponds to the pinwheel-shaped pattern.

20. The method of claim 16, wherein the second portion of the second material layer is removed using a gas under inductively coupled plasma.

* * * * *